R. C. BARTLETT.
AUTOMOBILE CONSTRUCTION.
APPLICATION FILED AUG. 4, 1913.
1,124,687.
Patented Jan. 12, 1915.
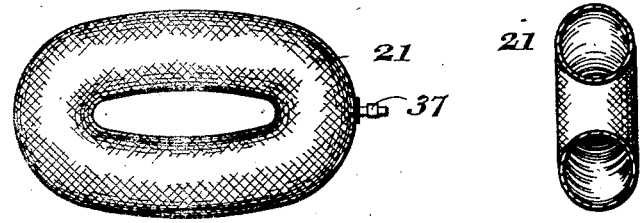
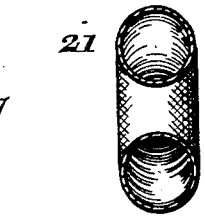
Fig. 1.    Fig. 2.
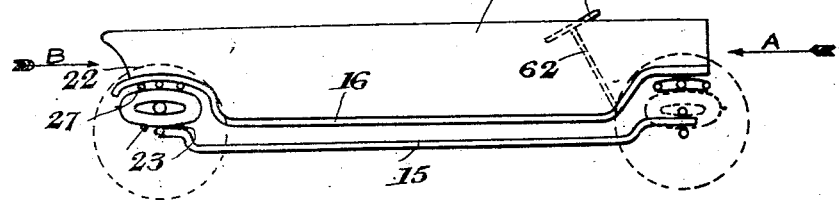
Fig. 3.
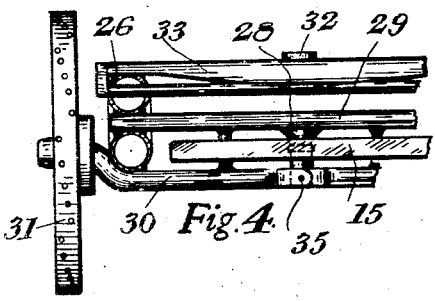
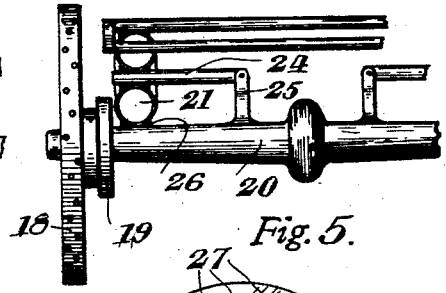
Fig. 4.    Fig. 5.
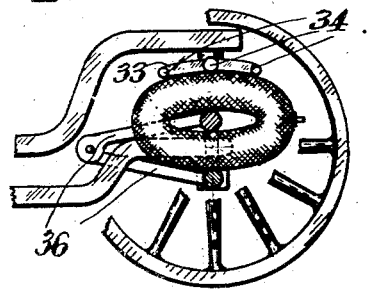
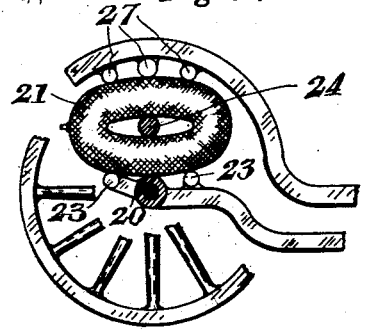
Fig. 6.    Fig. 7.
Witnesses.
C. W. Fidler
Inventor.
R. C. BARTLETT.
by
Fetherstonhaugh & Co.
attys.

UNITED STATES PATENT OFFICE.

REGINALD CLEVELAND BARTLETT, OF SOUTH PORCUPINE, ONTARIO, CANADA.

AUTOMOBILE CONSTRUCTION.

1,124,687.  Specification of Letters Patent.  Patented Jan. 12, 1915.

Application filed August 4, 1913. Serial No. 782,918.

*To all whom it may concern:*

Be it known that I, REGINALD CLEVELAND BARTLETT, a subject of the King of Great Britain, residing at South Porcupine, in the Province of Ontario, Dominion of Canada, have invented certain new and useful Improvements in Automobile Construction, and do hereby declare that the following is a full, clear, and exact description of the invention, such as will enable others skilled in the art to which it appertains to make and use the same.

This invention relates to improvements in automobile construction and the objects of the invention are to provide a new pattern of automobile especially adapted to cope with traffic conditions on snow, loose ground or mud as well as ordinary paved roads, and having its parts especially designed for use under these conditions.

A further object of the invention is to abolish the present expense and weight incident to the use of pneumatic tires and at the same time to afford equal, if not greater, resiliency, and amount of life to the wheels.

A further object is to provide an air cushion or a series of air cushions between the axles of the wheels of the device and the carriage, adapted to have a variable air pressure arranged to meet the particular circumstances under which the car is being used.

With a view to illustrating more clearly the nature of my invention, I append to the specification drawings in which:—

Figure 1 is a side elevation of one of the cushioning devices. Fig. 2 is a cross section through Fig. 1. Fig. 3 shows a side elevation of the framework of the automobile. Fig. 4 is an elevation view looking from the front of the automobile, that is in the direction of the arrow A on Fig. 3. Fig. 5 is an elevation looking on the rear end of the automobile in the direction of arrow B on Fig. 3. Fig. 6 is a side elevation of the arrangement of frame cushion and axle for the front wheels of the automobile, and Fig. 7 is a side elevation of the rear wheel and cushioning means showing the relative arrangement between the spindle, the cushions and the body or box of the automobile.

In the construction of automobiles up to the present, it has been customary to provide a cushioning means consisting of pneumatic tires fastened by a variety of methods on the outside of wheels and of supporting these wheels by steel springs to the body of the automobile. This method does not, however, completely obviate the transmission of vibration from the framework and the wheels to the body or box of the car, and though this may be well upholstered or cushioned, that is the body or seats of the car, yet the effect of this vibration is unpleasant to the users of such conveyance. Further, pneumatic tires in order to have serviceable qualities when used with roads in this country require to be very substantial and are correspondingly costly, and steel springs with their various fittings also add to the cost of the construction of the automobiles at present in use.

In my invention I have dispensed with both the tires and the steel springs which have been up to the present considered a necessity in the construction of automobiles for passenger use, and I have replaced these elements by substituting a springing means comprising an air cushion which is disposed intermediate of the axle and the framework and box of the car, and I am thus able to use wheels with a comparatively hard facing.

Referring now to the drawings in which I have illustrated one particular method of carrying out my invention (which method, however, I do not by any means limit myself to in the practical exploitation of the invention), and referring more particularly to Figs. 3, 4, 5, 6 and 7 the frame of the automobile, it will be seen, is to be constructed in two separate pieces 15 and 16, of which 15 is the lower piece and 16 the frame on which the box or body 17 of the car rests.

The arrangement of the back wheels is shown especially in Figs. 3, 5 and 7, in which 18 represents the wheel, 19 represents the brake and 20 the housing containing the shafts and differential gear. It will be seen that the arrangement here of an air cushion 21 which will be more particularly described hereinafter, is arranged between the housing 20 and that end 22 of the upper frame 16 on which the body is secured. The air cushion 21 rests on supports 23 secured to the lower frame 15 at the rear end as well as on the housing 20 and is arranged with a spacing bar 24 which is preferably pivotally secured to a bracket 25 extending from the housing 20 or may merely be fastened by the friction caused by its engagement with the air cushion at either end and extend right across the rear of the car, if the design of the particular embodiment of car permits of this being done. 26 represents facings which may be formed on the shaft housing, on the spacing bar 24, and on that part 23 of the lower frame and 27 of the upper frame, which are particularly adapted to engage this air cushion. The supports 23 and 27 are preferably constructed of steel tubes or the like secured respectively to the frames 15 and 16.

The arrangement for the front wheels is particularly shown in Figs. 3, 4 and 6 and is somewhat different from that of the rear wheels. It will be noticed that the front end of the lower frame 15 is pivotally secured to the pin 28 which extends between a spacing bar 29 and the axle 30 of the front wheel 31, and that the upper frame 16 is pivotally secured to a central boss or the like 32 formed at the center of the upper cushion seat 33. The cushion seat 33 is constructed in a similar fashion to the rear cushion seats inasmuch as it is preferably formed with hollow tubes 34 adapted to provide a seating for the air cushions 21 and also with facings 26 similar to the facings shown in the framework of the rear wheels. It will be noted that the axle 30 is made in two pieces and pivoted by a pin 35 running through forked ends of these two pieces to the pin 28 so that the ends of the axle may swing up and down as the air may be compressed or allowed to expand in the air cushions, according to the jolting of the automobile. The spacing bar 29 shown in Fig. 4 and the front axle 30 are connected together, not only by the pin 28 but also by pivotally connected shear-like arms 36, see Fig. 6, adapted to assist in transmitting any jolting which may be received by the wheels evenly to the supporting mechanism.

The construction of the air cushion which I prefer to employ is particularly shown in Figs. 1 and 2, in which 21 represents a cushion of ovoid outlines and circular section constructed very much after the fashion of a pneumatic tire. The cushion is preferably made having an inner layer of rubber on the outside of which is a layer or layers of impregnated canvas which may be of any suitable thickness. 37 represents a valve secured at one end to the outside of the cushion adapted for inflating or releasing some of the air pressure in the cushion. I do not wish to restrict the nature of this valve as any of the valves now on the market might be used for this purpose and it might be desirable to employ a valve having accommodation for flexible connection to a pressure valve. It will be followed that by varying the pressure of air in the cushions 21 a very sensitive cushion can be secured adapted to support an extremely variable load by merely varying the air pressure. It will further be followed that the first or initial cost of these cushions would be much less than that of tires inasmuch as they are of smaller volume and do not require nearly the same thickness of material or stability. The cost of upkeep also will be greatly diminished as there will be a minimum amount of wear on these cushions and the steel or solid rubber coverings on the outside of the wheel will be the only parts needing occasional replacement. Further, it will be possible to use rubber here of much inferior quality to that which is used in pneumatic tires.

As many changes could be made in the above construction and many apparently widely different embodiments of my invention, constructed within the scope of the claims, without departing from the spirit or scope thereof it is intended that all matter contained in the accompanying specification and drawings shall be interpreted as illustrative and not in a limiting sense.

What I claim as my invention is:

1. In an automobile and the like, the combination with the main frame and main axle and supplemental axle or support located above and connected to the main axle, of an endless cushion interposed between the upper frame carrying the body and each end of the main axle and having an opening in the center through which the supplemental axle or support extends, whereby four bearing points vertically above one another and midway of the length of the cushion are provided, two within the opening of the cushion and two without, as and for the purpose specified.

2. In an automobile or the like, an upper frame, a lower frame, said lower frame being secured at its rear end to the bearings or housing of the rear wheel spindle and being pivotally secured at the front end to an air cushion framework, said air cushion framework comprising a spacing bar adapted to pass between opposite sides of an air cushion and a front wheel spindle formed in two parts pivotally connected one to the other and also pivotally connected to said spacing bar, an air cushion between said pivoted spindle ends and said spacing bar.

3. In an automobile, an arrangement for springing the rear wheel whereby a vertical ovoid shaped air cushion is inserted wholly between the spindle housing and the frame work of the body, and having spacing means adapted to space said air cushion said means comprising a spacing rod pivotally secured to said housing.

4. In an automobile or the like, a front spindle formed in two parts pivotally connected one to the other, a frame, air cushions between said spindle and said frame, a spacing bar secured intermediate of said air cushions, a pivot secured to said spacing bar adapted to act as a fulcrum for said parts of said spindle.

5. In an automobile and the like, the combination with the rear axle, a body supporting frame suitably supported at the rear on said axle, and the front axle, of an endless cushion member set edgewise on the front axle and supporting the body supporting frame on its upper periphery, a lower frame connected to the rear axle, and means for supporting the front end of such frame from the inner periphery of the endless cushion member, as and for the purpose specified.

6. In an automobile and the like, the combination with the rear axle and the front axle comprising two members hinged together to move in a vertical plane, of pneumatic cushions carried by the axles, an upper body supporting frame carried by the cushions, a lower frame carried by the axles and means held in suspension by the cushions for pivotally supporting the center of the divided front axle, as and for the purpose specified.

7. In an automobile and the like, the combination with the wheel axles, a lower frame carried by the axles and an upper body supporting frame, of transverse members located intermediately of the upper and lower frames, air cushions surrounding said transverse members and having their lower peripheral portions resting on the axles and having their upper peripheral portions carrying the body supporting frame, as and for the purpose specified.

8. In an automobile and the like, the combination with a suitable front and rear axle suitably connected together, and the body, of a transverse member extending over the front axle, air cushions surrounding such transverse member and having their lower peripheral portion resting on the front axle and having the body bearing upon their upper peripheral portion and means for suitably supporting the rear portion of the body, as and for the purpose specified.

9. In an automobile and the like, the combination with a suitable front and rear axle suitably connected together and the body of a transverse member extending over the front axle, air cushions surrounding such transverse member and having their lower peripheral portion resting on the front axle and having the body bearing upon their upper peripheral portion, a hinge like connection between the transverse member and the front axle, and means for suitably supporting the rear portion of the body, as and for the purpose specified.

10. In an automobile and the like, the combination with a suitable front axle divided centrally and having a hinge connection and a rear axle connected to said front axle and the body of a transverse member extending over the front axle, air cushions surrounding such transverse member and having their lower peripheral portion resting on the front axle and having the body bearing upon their upper peripheral portion, a hinge like connection between the transverse member and the front axle, and means for suitably supporting the rear portion of the body as and for the purpose specified.

11. In an automobile and the like, the combination with a suitable front axle divided centrally and having a hinge connection and rear axle suitably connected to said front axle and the body, of a transverse member extending over the front axle, air cushions surrounding such transverse member and having their lower peripheral portion resting on the front axle and having the body bearing upon their upper peripheral portion, a hinge like connection between the transverse member and the front axle, and means for suitably supporting the rear portion of the body, and a hinge connection between the transverse member and members of the divided axle as specified.

12. In an automobile and the like, the combination with the front and rear axles and rear axle housing, of a divided transverse member, the inner ends of which are pivotally supported on the aforesaid housing, an air cushion surrounding the free end of each transverse member and resting on the axle and a body supporting member carried on the upper peripheral portion of such cushion, and means for supporting the front portion of the body of the front axle, as and for the purpose specified.

13. In an automobile and the like, the combination with the front and rear axles suitably connected together and a body supporting frame, of transverse members extending intermediately between such axle and the body supporting frame, ovoid air cushions carried thereby and resting on the axles and designed to carry the body supporting frame, as specified.

14. In an automobile and the like, the combination with triple transverse members, the upper member being designed to carry the body and the lower member the wheels, of air cushions surrounding the center member and bearing against the upper and lower transverse members as and for the purpose specified.

In witness whereof I have hereunto set my hand in the presence of two witnesses.

REGINALD CLEVELAND BARTLETT.

Witnesses:
RUSSEL S. SMART,
CANEL W. FIDLER.